April 3, 1928. 1,665,130
D. A. ELLIOTT
VENTILATOR
Filed Feb. 23, 1926
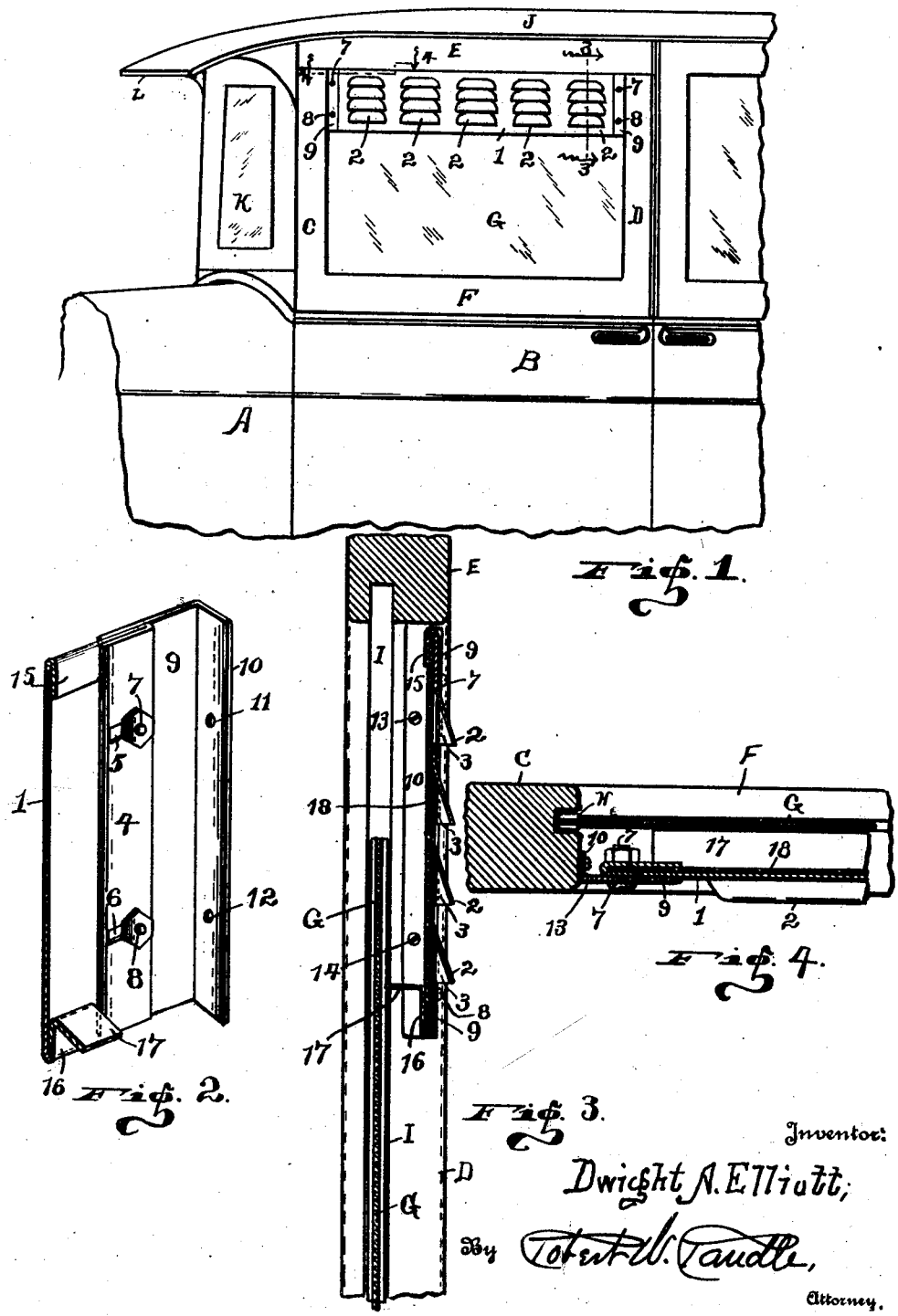
Inventor:
Dwight A. Elliott,
By Robert W. Caudle,
Attorney.

Patented Apr. 3, 1928.

1,665,130

UNITED STATES PATENT OFFICE.

DWIGHT A. ELLIOTT, OF RICHMOND, INDIANA.

VENTILATOR.

Application filed February 23, 1926. Serial No. 89,863.

The object of my present invention, broadly speaking, is to provide a ventilator of simple and inexpensive construction, easily and quickly installed and without marring that to which it is attached, occupying but a minimum of space and even that being such space that is not available for any other purpose; the same being adapted to give a maximum of efficiency in practice, and which can be manufactured and installed with a minimum of time and expense.

My invention is adapted to be installed with almost any kind of window or other opening, but it is especially applicable to use in connection with the windows of closed automobiles, whereby one may have the desired amount of ventilation or fresh air entering the vehicle but without perceptible drafts, and by which rain or snow or other weather condition, and by which insects and particles of dirt, may be excluded from the interior of the vehicle.

Other special objects and particular advantages of the invention will be made apparent in the course of the following description.

For the purpose of making clear the several advantages and the operation of my invention, I have shown the same in connection with an automobile body, as in the accompanying drawings, in which—Figure 1 shows a portion of one side of an automobile, with my invention installed in connection with the window of the front left door. Figure 2 is a perspective view of the inside face of one end of the ventilator, taken on an enlarged scale from Fig. 1. Figure 3 is a vertical cross section, as taken on the line 3—3 of Fig. 1, but on an enlarged scale from that of Fig. 1. And Figure 4 is a horizontal cross section of a portion of the door and of the other end portion of the ventilator from that shown in Fig. 3, the same being taken on the line 4—4 of Fig. 1.

Similar indices denote like parts throughout the several views.

In order that the construction, the operation, and the several advantages of my invention may be more fully understood and appreciated, I will now take up a description of the same in which I will set forth the parts as fully as I may.

In the drawings letter A denotes a portion of an automobile body having the door B in the side thereof, there being the usual window in the door, the same being located between the stiles C and D, the top bar E and the bottom bar F, there being a glass transparency G mounted to move up and down in the channels H and I formed in the respective stiles C and D.

J denotes the top of the automobile; K denotes the wind-shield or front window; and L denotes the vizor.

All of said parts are of ordinary construction, and my invention is not to be limited to the particular arrangement of parts shown.

The body 1 of my device comprises a flat sheet of metal of oblong shape, having a plurality of horizontal cuts or incisions therethrough, arranged in vertical rows, with the metal above each incision pressed outward, thereby forming the downwardly inclined slats 2 and slots 3, whereby the air from the outside must pass upward under the lower edges of said slats 2 and through the slots 3, thereby preventing direct drafts from passing through the slots 3.

The material of the member 1 is doubled in upon itself at each end, thereby forming reinforcements, as the reinforcements 4 shown most clearly in Fig. 2; and formed through each of said reinforcements 4 and the ends of the member 1, are two slots 5 and 6, upper and lower respectively, as shown in Fig. 2, which slots are formed longitudinally of the member 1, to receive bolts 7 and 8, for the purpose hereinafter set forth.

Two end members are provided, which are identical with each other each of which is L-shaped in cross section, and comprising the face portion 9 and the angular portion 10, substantially as shown.

Formed through the member 9 are two apertures to receive the bolts 7 and 8 therethrough. And formed through the member 10 are two apertures 11 and 12 which are adapted to receive the respective screws 13 and 14, whereby the said end members may be rigidly secured to the opposing faces of the edges of the stiles C and D, with the members 10 contacting flat against the inner edges of said stiles and with the members 9 directed toward each other, as in Fig. 1.

After said end members are secured as stated then the member 1 is brought to position with the end portions thereof contacting flat against the inner faces of the members 9, where it is secured by means of the bolts 7 and 8, at each end, which bolts are inserted through said apertures in the members 9, and at the same time through the slots 5 and 6 at each end, whereby the body member 1 is secured in operative position, as shown in Fig. 1.

By reason of the slots 5 and 6 it is evident that I am enabled to adjust the length of the ventilator in order to compensate for slight variations in the distance between the stiles C and D.

The upper edge of member 1 is turned back and doubled upon itself thereby forming the flange or cleat 15. Also the lower edge of the member 1 is turned back and doubled upon itself, thereby forming the flange or cleat 16.

Extending directly back from the upper edge of the flange 16, and integral therewith, is the tongue 17 which when the device is properly secured in operative position, approaches near to the glass G, as shown in Fig. 3.

Numeral 18 denotes a screen which covers the rear side of the member 1, with its edges secured by the flanges 15 and 16 which are pressed tightly into contact therewith.

By the above it will be seen that the tongue 17 prevents the wind from entering the vehicle between the glass G and the flange 16, and whereby the air entering the vehicle must pass through the slots 3, and therefore through the screen 18.

The screen 18 not only prevents the entrance of insects and particles of dirt, but it also contributes to cutting down the force of draft through the slots 3, and whereby only clean air will enter the vehicle and that without apparent draft or appreciable currents of wind, while rain, snow, and the like will be excluded.

I desire that it be understood that various changes may be made in the several details herein set forth without departing from the spirit of the invention and without sacrificing any of the advantages thereof which are new and useful.

Having now fully shown and described my invention, what I claim and desire to secure by Letters Patent of the United States, is—

In combination with a window having fixed stiles, and a glass adapted to slide up and down between said stiles; a ventilator located between said stiles and comprising a sheet-metal member forming the body of the ventilator and having a plurality of horizontal cuts therethrough with the upper edge of each cut curved outward forming downwardly directed openings throughout the face of the body, a reinforcement at each end of the body, the same being formed by doubling the ends of the body, there being slots formed through the said reinforcements and the adjoining portions of the body, L-shaped end members secured to the respective stiles, there being slots formed through the portions of the end members which extend toward each other with each of the slots last mentioned being in register with the said slots in the ends of the main member, bolts extending through all of said slots providing means whereby the main members may be adjustably secured whereby the ventilator may be adjusted to varying distances between the stiles, a flange formed along the inner lower edge of the body member, a tongue extending back from said flange to near the face of the glass, and a screen covering the inner side of the main member.

In testimony whereof I have hereunto subscribed my name.

DWIGHT A. ELLIOTT.